United States Patent
Magnin

(10) Patent No.: US 11,204,310 B2
(45) Date of Patent: Dec. 21, 2021

(54) OPTICAL FLOW CYTOMETER FOR EPI FLUORESCENCE MEASUREMENT

(71) Applicant: BIT GROUP FRANCE, Montpellier (FR)

(72) Inventor: Olivier Magnin, Chapareillan (FR)

(73) Assignee: BIT GROUP FRANCE, Montpellier (FR)

(*) Notice: Subject to any disclaimer, the term of this patent is extended or adjusted under 35 U.S.C. 154(b) by 0 days.

(21) Appl. No.: 16/649,576

(22) PCT Filed: Sep. 21, 2017

(86) PCT No.: PCT/IB2017/001345
§ 371 (c)(1),
(2) Date: Mar. 20, 2020

(87) PCT Pub. No.: WO2019/058152
PCT Pub. Date: Mar. 28, 2019

(65) Prior Publication Data
US 2020/0408665 A1    Dec. 31, 2020

(51) Int. Cl.
*G01N 15/02*    (2006.01)
*G01N 15/14*    (2006.01)
(Continued)

(52) U.S. Cl.
CPC ..... *G01N 15/1436* (2013.01); *G01N 21/6486* (2013.01); *G01N 2015/0065* (2013.01)

(58) Field of Classification Search
CPC .......... G01N 15/0205; G01N 15/0211; G01N 15/1459; G01N 2021/4716; G01N 15/1434
(Continued)

(56) References Cited

U.S. PATENT DOCUMENTS

| 2005/0112541 A1 | 5/2005 | Durack et al. |
| 2009/0068726 A1 | 3/2009 | Magnin et al. |
| 2011/0044910 A1 | 2/2011 | Lin et al. |

FOREIGN PATENT DOCUMENTS

| EP | 0121261 | 10/1984 |
| JP | H03235037 A | 10/1991 |

(Continued)

OTHER PUBLICATIONS

De Grooth et al., "Multiple Wavelength Illumination in Flow Cytometry Using a Single Arc Lamp and a Dispersing Element", Cytometry 8, 1987, pp. 445-452, Alan R. Liss, Inc.
(Continued)

*Primary Examiner* — Md M Rahman
(74) *Attorney, Agent, or Firm* — Greer, Burns & Crain, Ltd.

(57) ABSTRACT

An optical flow cytometer for blood cell characterization, comprising:
  a flowcell providing a blood cells flow,
  at least one light-emitting diode for illuminating blood cells that are flowing in the flowcell,
  an epifluorescence module in which a same first lens group is used for focusing the—excitation light in the blood cells flow and for collecting fluorescence light coming from each blood cell, and a unitary photodetector for detecting the epifluorescence light coming from the first lens group,
  at least one of the following measurement modules includes:
    a light scattering measurement module,
    an axial light losses measurement module,
    a particle impedance measurement module.

11 Claims, 1 Drawing Sheet

(51) Int. Cl.
*G01N 21/64* (2006.01)
*G01N 15/00* (2006.01)

(58) Field of Classification Search
USPC .......................................................... 356/336
See application file for complete search history.

(56) References Cited

FOREIGN PATENT DOCUMENTS

| | | |
|---|---|---|
| JP | 2003071335 A | 3/2003 |
| WO | 2010/126838 A1 | 11/2010 |
| WO | 2013/101675 A2 | 7/2013 |

OTHER PUBLICATIONS

International Search Report from the corresponding International Patent Application No. PCT/IB2017/001345, dated Jun. 11, 2018.

OPTICAL FLOW CYTOMETER FOR EPI FLUORESCENCE MEASUREMENT

BACKGROUND

The present invention relates to an optical flow cytometer for blood cell characterization by fluorescence on a blood cells flow. It concerns the field of automatic devices for the counting and characterization of particles suspended in a liquid medium, and more particularly the field of haematology instruments for counting and characterizing the various types of cells contained in a blood sample.

The state of the art and the proposed invention thus relate to devices for counting for example the number of leukocytes contained in a blood sample and for determining their relative distribution within various subpopulations based on light scattering and fluorescence.

In a known optical flow cytometer, a sample is focused into a cells flow. A focused laser beam is directed perpendicularly to the flowing blood cells.

As soon as a laser light source is used in a fluorescence flow cytometer optical setup, fluorescence light is measured perpendicular to the laser beam direction.

The laser delivers a beam that is focused inside the flowcell into an elliptical Gaussian spot of typical dimensions 100 µm×30 µm.

The design constraints of the laser focusing optics derive from the very specific nature of the laser output beam. Typical laser focusing optics have long focal length (>15 mm) to get the required 100 µm×30 µm spot size into the flowcell. Most laser focusing optics also have one or more cylindrical lenses to change the output beam circular profile into an elliptical one that is more adapted for flow cytometry measurements.

Using a short focal length laser focusing optics would require the output beam to be processed one more time before entering the focusing optics.

Furthermore, a long focal length optics cannot practically be used to collect fluorescence light. Since this kind of optics needs high numerical aperture. Using a long focal length would involve an extremely large lens diameter that is not realistic.

So, it is not possible to design optics that are performing well both for focusing a laser beam into an 100 µm×30 µm elliptical spot, and collecting fluorescence light with a high numerical aperture (NA).

For that reason, all laser based fluorescence flow cytometry setups rely on different lenses to focus the laser excitation beam and to collect fluorescence light.

This is the reason why fluorescence light is always collected along a direction perpendicular to the excitation beam in laser based fluorescence flow cytometry setups.

As a consequence, all setups of laser flow cytometry with fluorescence detection involve three lenses near three different walls of the flowcell. In this case, mechanical design becomes extremely challenging because there is very little space to secure all the optics along three different walls of the flowcell.

The known document US2009/0068726 describes a system comprising a lens group for fluorescence measurement arranged in 90 degrees with respect to the excitation axis.

It is well known that epi-fluorescence and particle scattering are easily measured if the optical setup contains two different light sources. Typically, a laser is used for particle scattering measurements and an additional extended light source (usually as arc lamp) is used for epi-fluorescence measurements. Rays of light that are impinging the scattering photodetectors originate from the laser source. For the epifluorescence measurement, the sample is excited by the arc lamp source.

This kind of setup is described in the document "*Multiple Wavelength Illumination in Flow Cytometry using a Single Arc Lamp and a Dispersing Element*" Cytometry A, Vol. 8, pp 445-452 (1987). That kind of hybrid setup is extremely expensive since two very different light sources are used. Each light source has its own focusing optics and its own photodetectors. Complexity of this kind of setup is a limiting factor when it comes to design, manufacture and align such a system. This complex setup is extremely difficult to turn into a rugged industrial transducer for routine analyzers.

The purpose of the present invention is to propose a compact optical flow cytometer for performing fluorescence measurement and scattering measurement.

Another purpose of the present invention is to propose a rugged optical flow cytometer.

SUMMARY

At least one of the above-mentioned purposes is achieved with an optical flow cytometer for blood cell characterization, comprising:
- a flowcell providing a blood cells flow,
- at least one light-emitting diode for illuminating blood cells that are flowing in the flowcell,
- an epifluorescence module in which a same first lens group is used for focusing the excitation light in the blood cells flow and for collecting fluorescence light coming from each blood cell, and a first unitary photodetector for detecting the epifluorescence light coming from the first lens group,
- at least one of the following measurement modules:
  - a light scattering measurement module,
  - an axial light losses measurement module,
  - a particle impedance measurement module.

The optical flow cytometer according to the invention offers a cytometer able to perform an epifluorescence detection and a measurement module in order to allows an analysis of cells.

According to the invention, the light scattering measurement module may comprise a second lens group for collecting light emerging from the flowcell, and at least one scattering detection channel comprising a unitary photodetector for detecting scattered light coming from the second lens group.

For example, the axial light losses measurement module may comprise a second lens group for collecting light emerging from the flowcell, and at least one axial light detection channel comprising a unitary photodetector for detecting scattered light coming from the second lens group; and in that it may comprise the same second lens group when the optical flow cytometer also includes the light scattering measurement module.

The optical flow cytometer according to the invention is radically different since the measurement of epi-fluorescence and scattering are performed from the same light source.

The same light source is used both for blood cell fluorescence excitation and blood cell scattering measurements.

The present optical flow cytometer is cheaper and much more rugged as the prior art systems and is perfectly compatible with an industrial manufacturing and use in routine analyzers.

Only two lens groups are used for focusing and collecting light; the first lens group being used for excitation light focusing and fluorescence light collection. There is no need for any third 90 degrees lens group.

Unlike standard epi-fluorescence microscopy setups, the optical flow cytometer according to the present invention allows measurement of light that is scattered by blood cells as it crosses the interrogation zone, the flowcell.

All standard epi-fluorescence microscopy systems rely on one or more CCD cameras to get one or more images of the interrogation zone. Blood cells characterization in standard fluorescence microscopy systems is performed by image processing software running in a processor unit.

The optical flow cytometer according to the present invention is radically different from typical epi-fluorescence microscopy since blood cells characterization does not rely on image acquisition but on particle scattering and epi-fluorescence measurements. This means that the unitary detectors detect analog signals (pulses) based on the intensity of light detected. The signals represent magnitude of light. There is no image. Thus, the measurement, performed by a processing unit, concerns each cell flowing successively in the flowcell.

The blood cell characterization according to the invention may rely on clustering of multi-dimensional dot plots. When a camera is used as in prior art, the blood cell characterization requires shape recognition from camera image acquisition.

According to the invention, the blood cell characterization may comprise characterization of white bloods cells, red blood cells, reticulocytes, reticulated platelets, . . . .

Accordingly, the optical flow cytometer of to the present invention uses only two lens groups, there is no measurement perpendicular to the axis of excitation of the cells flow. The mechanical design may therefore be easier. It is therefore possible to produce an optical flow cytometer with a wake dimension with respect to the prior art systems.

Moreover, the optical flow cytometer according to the invention requires less optical adjustments as the same lens group is used for excitation and fluorescence collection. Only two optical alignments are required against three with the standard perpendicular setup of prior art.

Because LEDs are non-coherent light sources, it is possible to generate an interrogation zone of uniform intensity and rectangular shape. A condenser lens and rectangular aperture can be used.

An interrogation zone of uniform intensity and rectangular shape greatly relaxes transverse positioning sensitivity of the flowing particles: light pulses characteristics (amplitude, width) are constant over the whole surface of the interrogation zone.

In standard laser flow cytometry setups of prior art, the interrogation zone is elliptical with a Gaussian intensity profile. Any deviation of flowing particles from the center of the interrogation zone involves a drop of light pulses amplitude and width.

In particular, the first lens group may be arranged at opposite side of the second lens group with respect to the flowcell.

Such an arrangement simplifies the mechanical design.

Preferably, the first lens group may be designed to shape and focus the light emitted by the light-emitting diode into an optical interrogation zone of preferably 110 µm×30 µm into the flowcell. In other words, the LED delivers a beam that is focused inside the flowcell into a uniform and rectangular interrogation zone of dimensions that are compatible with the measurement of cells one by one.

Preferably, the light-emitting diode may have a peak wavelength of less than 700 nm. This short wavelength enhances light scattering by blood cells internal structures. It leads to better differentiation between sub-populations of blood cells.

According to the invention, the scattering detection channel may comprise a diaphragm for selecting light along at least one direction.

Measurement of light scattered by blood cells in the forward direction—is related to the volume of the blood cell. This direction is very close from the excitation beam, typically less than 5 degrees. To perform this measurement, light emerging from the flowcell has to be collected along a specific direction.

According to a preferred embodiment of the invention, the second lens group is designed to collect the forward scattered light which is scattered by the blood cells flow at angle of 5 degrees and/or angle included in 5-20 degrees with respect to the illumination beam divergence.

According to another embodiment of the invention, the axial light detection channel may comprise optical means for measuring axial light losses.

The axial light loss is the measurement of the total light lost from the illumination beam at zero degree when a cell passes through the beam.

The optical flow cytometer may comprise a dichroic mirror for separating the fluorescence light with respect to the light emitted by the light-emitting diode.

Advantageously, the first lens group and the second lens group may contain at least one aspheric surface.

The use of aspheric lens allows reaching a high level of aberration correction for the light collecting optics.

LED output light collection efficiency, and re-focusing it into a small spot in the flowcell, for example 100 µm×30 µm, involves a highly divergent beam that can be reached with a high numerical aperture (NA) focusing optics.

According to a preferred embodiment of the invention, the first lens group focuses light emitted by the light emitting diode and collects epifluorescence light along a solid angle of at least 0.1 steradian, preferably along a solid angle of 1.1 steradian. Such values correspond to high numerical aperture, at least 0.17, preferably 0.57 respectively.

According to the invention, the use of high numerical aperture first lens group allows both to collect the highest possible amount of light from the LED and to collect the highest possible amount of fluorescence light from the flowcell.

According to a preferred embodiment of the invention, the first lens group may have a diameter of about 10 mm with an Equivalent Focal Length (EFL) from 4 mm to 7 mm.

According to a preferred embodiment of the invention, the first lens group may have a magnification ratio of about −0.1, the blood cells flow being located at a distance from 50 mm to 90 mm.

According to another embodiment of the invention, the second lens group may collect light scattered by blood cells along a solid angle of at least 0.1 steradian, preferably along a solid angle of 1.1 steradian.

With a second lens group having a high numerical aperture, it is possible to collect the highest possible amount of scattered light from the flowcell.

When light is scattered by a particle, it means that an incoming ray is deviated from its initial direction by the particle. The ray of light will emerge from the flowcell with an angle higher than the entry angle into the flowcell. Preferably, the second lens group may have a numerical aperture that is higher than the numerical aperture of the first lens group.

In other words, the first lens group typically may focus beam in the flowcell with an half-angle of θ=30 deg. This means that the second lens group has to handle rays with an angle of θ+α where α is the forward scatter angular range. When beam have such high apertures, it becomes very difficult to distinguish the boundary between the incoming illumination beam and the deviated beam scattered by the particle. A high level of aberration correction may preferably be applied on the lens groups.

According to another embodiment of the invention, the second lens group may have a diameter bigger than the diameter of the first lens group.

According to an advantageously embodiment of the invention, the flowcell may be configured to generate the blood cells flow according to the technique of hydrodynamic focusing, or passive sheath or no sheath at all. The LED works fine with passive sheath or no sheath, unlike lasers.

According to another embodiment of the invention, the particle impedance measurement module may comprise two electrodes that create an electrical sensing zone in the flowcell to measure impedance of the circulating blood cells by the Coulter principle.

This impedance measurement can be realized with DC current, AC current or both.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities.

DETAILED DESCRIPTION

Figure 1:
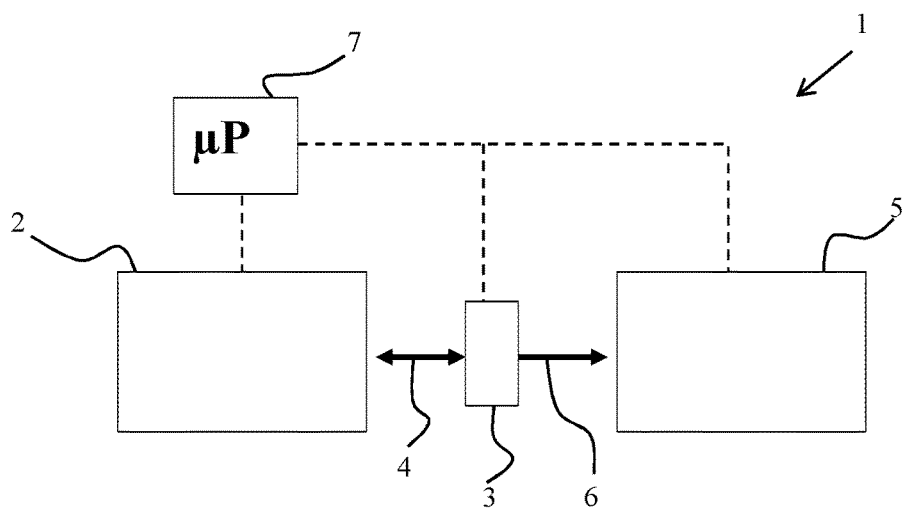
FIG. 1 is a schematic view illustrating components of an optical flow cytometer according to the invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention as defined by the appended claims.

Hereinafter, the present invention will be described in detail by explaining exemplary embodiments of the invention with reference to the attached drawings. Like reference numerals in the drawings denote like elements.

FIG. 1 is a schematic view illustrating components of an optical flow cytometer according to an exemplary embodiment of the present invention.

Referring to FIG. 1, the inventive optical flow cytometer 1 includes an excitation/epi-fluorescence module 2 for generating an excitation light towards a flowcell 3 and for collecting light coming from the flowcell in order to perform an epi-fluorescence measurement. The optical flow cytometer 1 comprises electromotive or/and other means to drive and focus sample cells or blood cells into a flow which is surrounded, or not, by sheath fluid. The blood cells circulate through the flowcell 3. A focused beam 4 generated by the excitation/epi-fluorescence module 2 is directed perpendicularly across the cells flow, and induces fluorescence of fluorescent sample particles. The epi-fluorescence light from the blood cells is collected by the same group of lenses of the excitation/epi-fluorescence module 2.

A scattering measurement module 5 is provided for collecting light 6 coming from the flowcell 3.

A processor unit 7 is provided to control the excitation/epi-fluorescence module 2 for the excitation and detection of epi-fluorescence signal. The processor unit 7 also controls the scattering measurement module 5 in order to detect a direct and/or indirect scattering signal.

According to the invention, the excitation light 4 focused into the flowcell, the epi-fluorescence light 4 directly coming from the flowcell and the scattered light 6 directly coming from the flowcell are coplanar. The scattering measurement module 5 is arranged at opposite side of the excitation/epi-fluorescence module 2.

Figure 2:
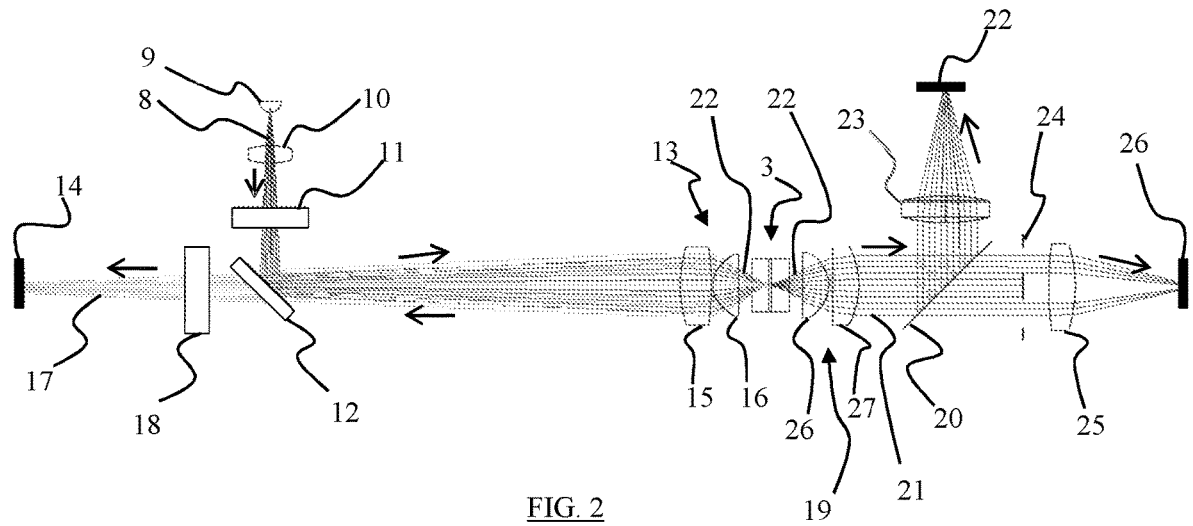
FIG. 2 is a schematic view illustrating the arrangement of optical components and the trajectory of the light.

FIG. 2 is a schematic view illustrating the detail arrangement of optical components and the trajectory of the light. Referring to FIG. 2, a setup suitable for performing epi-fluorescence and/or scattering measurements into an optical flow cytometer according to the invention is illustrated. An excitation light 8 is generated by a light-emitting diode (LED) operated on Blue or UV wavelength. A super bright LED can be used with a short wavelength, for example a peak wavelength less than 700 nm. The LED 9 can be used is continuous, modulated or pulse mode.

LEDs are extended, divergent and broadband light sources, whereas lasers are monochromatic point sources.

A condenser 10 is a lens provided to optimize light collection from the LED and to ensure uniformity into the flowcell, in the optical interrogation zone. As an example, the LED 9 has a 1.0 mm$^2$ light emitting area. Typical lens diameter for the Excitation/Fluorescence group is 10.0 mm. So the Effective Focal Length of the condenser 10 is typically chosen from 3.0 mm to 8.0 mm.

As the condenser 10 is located near the LED 9, its diameter can be 2.0 mm to 8.0 mm.

Such a condenser does not require fine aberration correction, it can be realized with one or two lenses. Accordingly, the condenser 10 may comprise at least one gradient index lens, at least one Fresnel lens, at least one asphere surface, at least one reflecting surface or at least one diffractive surface.

The excitation light passes through an excitation filter 11 to shorten the LED spectrum (i.e. excitation light spectrum) and to ensure that there is no overlap with fluorescence light.

A dichroic mirror 12 is arranged on the excitation light axis. The properties of this dichroic mirror 12 are chosen such that excitation light from the LED 9 is reflected towards the flowcell 3, while the epi-fluorescent light from the flowcell 3 is transmitted.

The excitation light is then directed to a first lens group 13 intended to focus excitation light as a spot or an optical interrogation zone into the cells flow.

The first lens group is also intended to collect and focus the epifluorescence light from the sample to a fluorescence unitary photodetector 14. To be able to trigger and detect a fluorescence signal, the first lens group focuses and collects light at least along 0.1 steradian, that is a numerical aperture (NA) of 0.17. Working with a solid angle of 1.1 steradian (NA=0.57) improves the detected fluorescence signal to noise ratio with a moderate amount of design complexity.

Typical lens diameter is about 10.0 mm which means this first lens group 13 has an Equivalent Focal Length (EFL) from 4.0 mm to 7.0 mm.

The first lens group provides a magnification ratio so that optical interrogation zone in the flowcell can have small dimensions. The magnification ratio is for example γ=−0.1 which means that the object, the cell, should be located from 50.0 mm to 90 mmm from the first lens group first principal plane depending on the chosen EFL. In this case, the image is formed at roughly 4.0 mm to 8.0 mm from the first lens group second principal plane. This is perfectly compatible with space required by standard flowcells.

Depending on the chosen numerical aperture, the first lens group 13 can contain from one to four lenses. The embodiment on FIG. 2, illustrates an example of two lenses 15 and 16.

The lenses can be singlets, cemented doublets or cemented triplets.

Accordingly, the first lens group 13 may comprise at least one gradient index lens, at least one Fresnel lens, at least one asphere surface, at least one reflecting surface or at least one diffractive surface. A combination of said lens may be considered.

At the output of the first lens group 13, light 4 is highly focused as an optical interrogation zone on the flow inside the flowcell.

Fluorescence light from blood cells is collected by the same first lens group 13. The excitation light and the epi-fluorescence light propagate in opposite directions.

The epi-fluorescence light then passes through the dichroic mirror 12 which forward transmits the epi-fluorescence light 17 via a fluorescence filter 18 to the unitary photodetector 14.

The fluorescence filter 18 removes residual blue stray light or back scattered light from measured epifluorescence light.

The preferred setup is based on unitary (single pixel) photodetector.

The unitary photodetector generates an analog signal proportional to the intensity of fluorescence light emitted by each blood cell . . . . The analog signal is then forwarded to the processing unit for fluorescence measurement.

As the light source is a LED (and not a laser), it is very easy to achieve a perfectly uniform light intensity at the interrogation zone in the flowcell 3. For this reason, it is no more mandatory to restrict the diameter of the flow that carries blood cells to be characterized.

As standard flow cytometry setups require flowcell with hydrodynamic focusing, the proposed optical setup works fine with all type of flowcells: hydrodynamic focusing, passive sheath or no sheath.

A second lens group 19 is provided on opposite site of the first lens group 13 with respect to the flowcell 3, but in the same optical axis. The second lens group 19 collects light 6 transmitted and scattered by cells. Detected scattered light is useful because it provides useful information for blood cells characterization.

The constraints on this second lens group 19 are quite similar than those in the first lens group 13. Only numerical aperture has been increased a bit to detect scattered light. Since it is mechanically difficult to move the lens group too close to the flowcell, it is preferable to use slightly increased lenses diameter. Typical lens diameter is about 11.0 mm.

The second lens group 19 can either collimate or focus light beam emerging from the flowcell.

If multiple measurements (i.e. multiple scattering angles, or axial light losses) are performed, it is preferable to have a collimated beam. This will ensure there is room enough for one or more beam splitting components.

If one single measurement is performed, the scattering lens group can directly focus the beam on a unitary photodetector.

Depending on the chosen numerical aperture, the second lens group 19 can contain from one to four lenses. The embodiment on FIG. 2, illustrates an example of two lenses 26 and 27.

Those lenses can be singlets, cemented doublets or cemented triplets.

Accordingly, the second lens group 19 may comprise at least one gradient index lens, at least one Fresnel lens, at least one asphere surface, at least one reflecting surface, or at least one diffractive surface. A combination of said lens may be considered.

The embodiment of FIG. 2 comprises a single beam splitter that allows two measurements, for example, forward scattering measurement and axial light losses measurement.

For an axial light losses measurement, a beam-splitter 20 is provided to direct a part of scattering light 21 towards a unitary photodetector 22 via a focusing lens 23.

For a forward scattering measurement, the light 21 that passes directly through the beam-splitter 20 is directed to a scattering stop or a diaphragm 24 which is intended to transmit light scattered only at a specific angle, for example low or medium angle. A focusing lens 25 is provided to direct the light passing through the scattering stop 24 to a unitary photodetector 26.

The beam splitter makes it possible to perform several scattering (or light losses) measurements from the collected beam. It is possible to consider several beam-splitters to get more than two measurements.

Beam-splitter can rely on specific semi reflective coating or on Fresnel losses by any uncoated light transmitting material.

It is also possible to use additional right angle optics to measure light scattered perpendicularly to the excitation beam.

Figure 3:
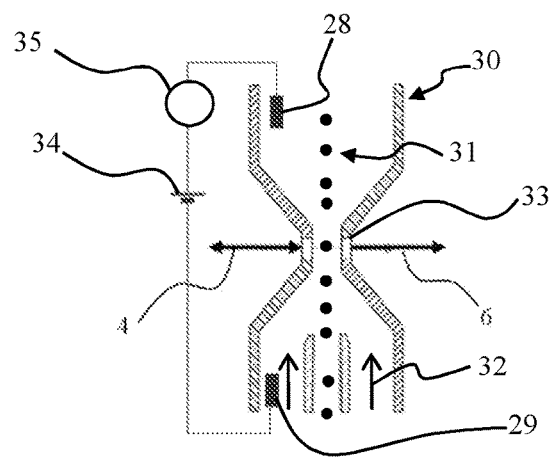
FIG. 3 is a schematic view illustrating the arrangement of electrodes for impedance measurement.

Referring to FIG. 3, a flow cytometer comprises flowcell 30 with a sample focused into a cells flow 31 which is surrounded, for example by sheath fluid 32. The focused LED light 4 is directed perpendicularly across the cells flow, and induces fluorescence in response to the impact of the light on cells. The scattered light 6 is collected by the second lens group 19 if provided.

The flowcell 30 could also comprises a narrowing 33 where the cells or particles are intended to pass through. Preferably, the narrowing 33 is in the axis of the cells flow 31. The excitation light 4 is arranged to cross the flowcell via the narrowing 33, perpendicularly to the flow of cells 31.

In the example depicted on FIG. 3, the narrowing 33 is provided when a particle impedance measurement is intended. Otherwise the flowcell may comprise no narrowing.

With the presence of the narrowing 33, two parts of the flowcell 30 can be defined: an upper part and a lower part, disposed on either side of the narrowing 33.

According to the invention electrodes 28 and 29 are provided in the flowcell 3, respectively in the upper part and the lower part. A power supply 34 and a measuring device 35 are provided to detect changes in electrical impedance of fluid between the two electrodes.

FIG. 3 is based on a flow cytometer with sheath fluid. However the impedance measurement module according to the invention can be included in a flow cytometer with passive sheath or no sheath at all.

Although the impedance measurement uses a narrowing which includes or overlaps the optical interrogation zone of epi-fluorescence measurement inside the flowcell, the impedance measurement may be performed out of the optical interrogation zone, upstream or downstream the optical interrogation zone. The optical interrogation zone corresponds to a volume inside the flowcell defined by the intersection of the excitation light beam and the flow of particles. Moreover, the impedance measurement may be performed with or without a light scatter measurement, with or without the axial light losses measurement.

Numerous variations and modifications will become apparent to those skilled in the art once the above disclosure is fully appreciated. It is intended that the following claims be interpreted to embrace all such variations and modifications.

The invention claimed is:

1. An optical flow cytometer for blood cell characterization, the optical flow cytometer comprising:
   a flowcell providing a blood cell flow;
   at least one light-emitting diode for illuminating blood cells that are flowing in the flowcell;
   an epifluorescence module in which a same first lens group is used for focusing the excitation light in the blood cell flow and for collecting fluorescence light coming from each blood cell, and a unitary photodetector for detecting the epifluorescence light coming from the first lens group; and
   at least one of the following measurement modules includes:
      a light scattering measurement module comprising a second lens group for collecting light emerging from the flowcell, and at least one scattering detection channel comprising a unitary photodetector for detecting scattered light coming from the second lens group and a diaphragm for selecting light along at least one direction, the second lens group being designed to collect the forward scattered light which is scattered by the blood cells flowing at angle of 5 degrees or less than 5 degrees with respect to the illumination beam divergence, the scattered light being related to the volume of the blood cells; and
      an axial light losses measurement module.

2. The optical flow cytometer according to claim 1 wherein the axial light losses measurement module comprises a second lens group for collecting light emerging from the flowcell, and at least one axial light detection channel comprising a unitary photodetector for detecting scattered light coming from the second lens group; and comprising the same second lens group when the optical flow cytometer also includes the light scattering measurement module.

3. The optical flow cytometer according to claim 1, wherein the first lens group is arranged at opposite side of the second lens group with respect to the flowcell.

4. The optical flow cytometer according to claim 1, wherein the first lens group is designed to shape and focus the light emitted by the light-emitting diode into —an optical interrogation zone of preferably 110 µm ×30 µm into the flowcell.

5. The optical flow cytometer according to claim 1, wherein the light-emitting diode has a peak wavelength of less than 700 nm.

6. The optical flow cytometer according to claim 1, further comprising a dichroic mirror for separating the fluorescence light with respect to the light emitted by the light-emitting diode.

7. The optical flow cytometer according to claim 1, wherein the first lens group and the second lens group contain at least one aspheric surface.

8. The optical flow cytometer according to claim 1, wherein the first lens group focuses light emitted by the light emitting diode and collects epifluorescence light along a solid angle of at least 0.1 steradian, preferably along a solid angle of 1.1 steradian.

9. The optical flow cytometer according to claim 1, wherein the second lens group has a numerical aperture bigger than the numerical aperture of the first lens group.

10. The optical flow cytometer according to claim 1, wherein the flowcell is configured to generate the blood cells flow according to the technique of hydrodynamic focusing, or passive sheath or no sheath at all.

11. The optical flow cytometer according to claim 1, further comprising a particle impedance measurement module including two electrodes that create an electrical sensing zone in the flowcell to measure impedance of the circulating blood cells by the Coulter principle.

* * * * *